United States Patent
Zhou et al.

(10) Patent No.: US 9,838,313 B2
(45) Date of Patent: Dec. 5, 2017

(54) METHOD, SYSTEM, CONTROL DEVICE AND NODE DEVICE FOR DATA TRANSMISSION

(71) Applicant: TENCENT TECHNOLOGY (SHENZHEN) COMPANY LIMITED, Shenzhen, Guangdong Province (CN)

(72) Inventors: Hongchang Zhou, Shenzhen (CN); Jie Chen, Shenzhen (CN); Shengyu Yin, Shenzhen (CN); Pu Cai, Shenzhen (CN); Xiaojie Dong, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/023,310

(22) PCT Filed: Sep. 19, 2014

(86) PCT No.: PCT/CN2014/086916
§ 371 (c)(1),
(2) Date: Mar. 18, 2016

(87) PCT Pub. No.: WO2015/039620
PCT Pub. Date: Mar. 26, 2015

(65) Prior Publication Data
US 2016/0241472 A1 Aug. 18, 2016

(30) Foreign Application Priority Data
Sep. 22, 2013 (CN) .......................... 2013 1 0432667

(51) Int. Cl.
*H04L 12/741* (2013.01)
*H04W 40/02* (2009.01)
(Continued)

(52) U.S. Cl.
CPC .............. *H04L 45/74* (2013.01); *H04L 43/08* (2013.01); *H04W 40/02* (2013.01);
(Continued)

(58) Field of Classification Search
CPC ..... H04L 45/74; H04L 43/08; H04L 67/1044; H04L 67/104; H04W 40/02; G06F 2221/0788; G06F 17/30206
See application file for complete search history.

(56) References Cited

U.S. PATENT DOCUMENTS 6,930,983 B2 * 8/2005 Perkins ............. H04L 29/06027
370/252
8,316,146 B2 * 11/2012 Ehn ...................... H04L 65/4084
709/217
(Continued)

FOREIGN PATENT DOCUMENTS

CN       101075969 A     11/2007

OTHER PUBLICATIONS

International Search Report and Written Opinion of the ISA for PCT/CN2014/086916, ISA/CN, Beijing, dated Jan. 4. 2015.

*Primary Examiner* — Brian O'Connor
(74) *Attorney, Agent, or Firm* — Harness, Dickey & Pierce, P.L.C.

(57) ABSTRACT

The application discloses a method, system, control device and node device for data transmission. The method includes determining a source node for data transmission; selecting a node which has not been selected for reception of the data as a destination node for the data transmission, from a list of nodes for the reception of the data, wherein the destination node serves as the next nearest node of the source node; wherein the list of nodes comprises at least one identifier and an address of each node; and issuing a data transmission task to the source node, wherein the data transmission task comprises the identifier and the address of the destination node, so that the source node transmits the data to the destination node according to the address of the destination node. The technical solutions of the application can guar- (Continued)

antee the data transmission speed and the data transmission efficiency.

15 Claims, 7 Drawing Sheets

(51) Int. Cl.
 *H04L 12/26* (2006.01)
 *G06F 17/30* (2006.01)
 *H04L 29/08* (2006.01)

(52) U.S. Cl.
 CPC .............. *G06F 17/30206* (2013.01); *G06F 2221/0788* (2013.01); *H04L 67/104* (2013.01); *H04L 67/1044* (2013.01)

(56) References Cited

U.S. PATENT DOCUMENTS

| | | | | |
|---|---|---|---|---|
| 8,675,518 B2 * | 3/2014 | Thompson | ............. | H04L 12/28 370/254 |
| 9,183,163 B2 * | 11/2015 | Frei | ..................... | H04L 29/1249 |
| 9,516,082 B2 * | 12/2016 | Hoffert | ................... | H04L 65/60 |
| 2013/0128775 A1 | 5/2013 | Dai et al. | | |
| 2014/0161129 A1 * | 6/2014 | Thompson | ............. | H04L 12/28 370/392 |
| 2014/0258526 A1 * | 9/2014 | Le Sant | .................. | H04L 43/08 709/224 |
| 2015/0039781 A1 * | 2/2015 | Hoffert | ................... | H04L 65/60 709/231 |
| 2015/0040169 A1 * | 2/2015 | Hoffert | ................... | H04L 65/60 725/88 |
| 2015/0058461 A1 * | 2/2015 | Guiditta | .............. | H04L 41/0843 709/223 |
| 2015/0180725 A1 * | 6/2015 | Varney | .................. | H04L 67/289 709/223 |
| 2015/0180971 A1 * | 6/2015 | Varney | .................. | H04L 67/289 709/204 |
| 2016/0043926 A1 * | 2/2016 | Frei | ..................... | H04L 29/1249 709/224 |

* cited by examiner

METHOD, SYSTEM, CONTROL DEVICE AND NODE DEVICE FOR DATA TRANSMISSION

CROSS REFERENCE TO RELATED APPLICATIONS

This application is a 371 U.S. National Phase of International Application PCT/CN2014/086916, filed on Sep. 19, 2014, which claims benefit of priority to Chinese Application No. 201310432667.4, entitled "method, system, control device and node device for data transmission", filed on Sep. 22, 2013. The aforementioned patent applications are hereby incorporated by reference in their entirety.

FIELD OF THE APPLICATION

The application relates to a field of computer technology, and particularly, to a method, system, control device and node device for data transmission.

BACKGROUND

As the development of communication technology, exchanges among people increasingly depend on data transmission, so that there is a need for a large amount of data transmissions and data exchanges among hosts storing data. Accordingly, the data transmission technology has received widespread attention and has become an important symbol for the development of communication technology.

Typically, there are two implementations for data transmission between the hosts. The first implementation is Remote sync (Rsync), which may achieve point-to-point data transmission between the hosts. The second implementations is port mapping by VIDC, which can be implemented by the following steps: firstly, a source node transmits data to another node; then the node after receiving all the data serves as a new source node; the new source node and the original source node, together with other nodes having received all the data, transmit data to other node not receiving the data.

There exist at least the following problems in the prior implementations for data transmission.

In the first implementation, although data may be point-to-point transmitted from one host to another, for multi-point transmission, the data has to be successively transmitted to each node by virtue of manual manipulation and the nodes cannot be effectively controlled. As a result, data transmission rate is slow and data transmission efficiency is low. As compared with the first implementation, the second implementation significantly improves the data transmission rate, but causes some other problems, such as, LAN traffic required by each node for data transmission and usage of CPU are uneven, and a large file requires long time for transmission leading to low data transmission efficiency (e.g., the generation of a virtual host depends on fast replication of image files which are very big).

This section provides background information related to the present disclosure which is not necessarily prior art.

SUMMARY OF THE APPLICATION

In order to solve the problems of the prior implementations, the application provides a method, system, control device and node device for data transmission.

On an aspect of the application, a method for data transmission is provided, wherein the method comprises the following steps:

determining, by a control device, a source node for the data transmission;

selecting, by the control device, a node which has not been selected for reception of the data as a destination node for the data transmission, from a list of nodes for the reception of the data, wherein the destination node for the data transmission serves as the next nearest node of the source node for the data transmission on a transmission chain; wherein the list of nodes comprises at least one identifier of each of the nodes for the reception of the data and an address of each node; and issuing, by the control device, a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission.

On another aspect of the application, another method for data transmission is provided, wherein the method comprises the following steps:

receiving, by a node serving as a source node for the data transmission, a data transmission task issued by a control device, wherein the data transmission task include an identifier of a destination node for the data transmission and an address of the destination node for the data transmission;

transmitting, by the node, data to the destination node for the data transmission, according to the address of the destination node for the data transmission.

On another aspect of the application, a control device is provided, wherein the device comprises the following modules:

a determining module, configured to determine a source node for a data transmission;

a selecting module, configured to select a node which has not been selected for reception of the data as a destination node for the data transmission, from a list of nodes for the reception of the data, wherein the destination node for the data transmission serves as the next nearest node of the source node for the data transmission on a transmission chain; wherein the list of nodes comprises at least one identifier of each of the nodes for the reception of the data and an address of each of the nodes; and an issuing module, configured to issue a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission.

On another aspect of the application, a node device is provided, wherein the device comprises the following modules:

a receiving module, configured to receive a data transmission task issued by a control device, when the node device serves as a source node for the data transmission, wherein the data transmission task include an identifier of a destination node for the data transmission and an address of the destination node for the data transmission;

a sending module, configured to transmit data to the destination node for the data transmission, according to the address of the destination node for the data transmission.

On another aspect of the application, a system for data transmission is provided, wherein the system includes a control device and at least one node device. The control device adopts the control device described above, and the node device adopts the node device described above.

The technical solutions provided by embodiments of the application bring the following beneficial effects.

The embodiments of the application implement a chained data distribution scheme using the abovementioned technical solutions. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solutions provided by embodiments of the application may transmit the data without manual manipulation, so that a control device may effectively control the nodes, the data transmission rate is fast and data transmission efficiency is high. As compared with the second implementation of the prior art, the technical solutions provided by embodiments of the application may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solutions provided by embodiments of the application may be applied to design and implementation of cloud platform. Therefore, the technical solutions provided by embodiments of the application solve the problem of coming on-line, expansion and migration of the virtual host, save a lot of time and provide better experience to users.

DESCRIPTION OF THE DRAWINGS

In order to more clearly illustrate the technical solutions of the embodiments of the present application, accompanying drawings used in description of the embodiments will be briefly described in the following. Obviously, the drawings described herein are only examples of the present application, and those skilled in the art may achieve other drawings based on these drawings without creative work.

DETAILED DESCRIPTION

In order to make the objects, technical solutions and advantages of the application more apparent, embodiments of the application will be further illustrated in details in connection with accompanying drawings.

Figure 1:
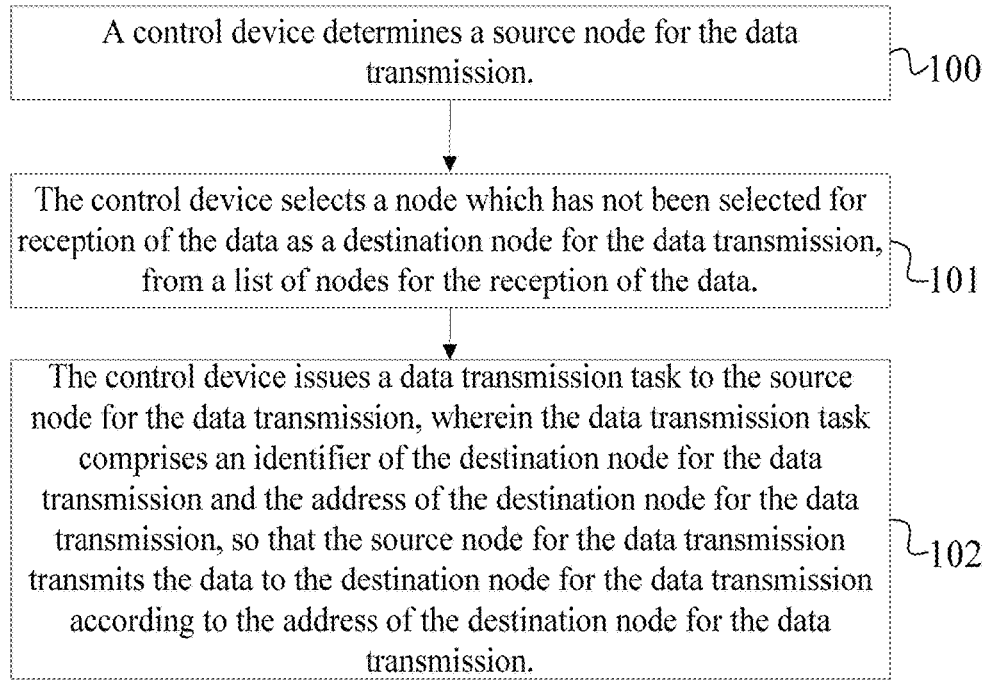
FIG. 1 is a flow diagram of a method for data transmission provided by an embodiment of the application.

FIG. 1 is a flow diagram of a method for data transmission provided by an embodiment of the application. As shown in FIG. 1, the method for data transmission provided by the embodiment may particularly include the following steps:

100. A control device determines a source node for data transmission.

101. The control device selects a node which has not been selected for reception of the data as a destination node for the data transmission, from a list of nodes for reception of the data.

In the embodiment, the destination node for the data transmission serves as the next nearest node of the source node for the data transmission; and the list of nodes includes at least one identifier of each of the nodes for the reception of the data (such as, number of the nodes) and address of each node (such as, IP address of each node).

In the transmission chain of the embodiment, the data is transmitted from front to back. Regarding to two neighboring nodes which are transmitting data, the former one is the source node for the data transmission and the latter one is the destination node for the data transmission.

102. The control device issues a data transmission task to the source node for the data transmission, wherein the data transmission task includes the identifier of the destination node for the data transmission and the address of the destination node for the data transmission, so that the source node for the data transmission transmits the data to the destination node for the data transmission according to the address of the destination node for the data transmission.

For example, the source node for the data transmission may transmit the data to the destination node for the data transmission according to the IP address of the destination node for the data transmission.

Optionally, the data transmission task may further include other parameters, such as, a path of data in the source node for the data transmission, a path in which the data will be stored in the destination node for the data transmission, so that the source node for the data transmission may read data from the path in the source node for the data transmission and transmit the data to the destination node for the data transmission, and the destination node for the data transmission may store the data in the path in the destination node for the data transmission.

The embodiment implements a chained data distribution scheme using the abovementioned technical solution. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solution provided by the embodiment may transmit the data without manual manipulation, so that a control device may effectively control the nodes, the data transmission rate is fast and data transmission efficiency is high. As compared with the second implementation of the prior art, the technical solution provided by the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution provided by embodiment may be applied to design and implementation of cloud platform. Therefore, the technical solution provided by the embodiment solves the problem of coming on-line, expansion and migration of the virtual host, saves a lot of time and provides better experience to users.

Optionally, on the basis of the technical solution provided by the above embodiment, step 100 may particularly includes two situations.

The first situation is that the control device determines that the source node for the data transmission is an original node storing the data before the data is sent, when firstly controlling sending the data.

And the second situation is that the control device operates the destination node for the last data transmission as the source node for the data transmission, when not firstly controlling sending the data.

When transmitted for the first time, the data was stored in the original node. When firstly controlling sending the data, the control device issued a data transmission task to the original node according to the IP address of the original node; the original node received the data transmission task, and sent the data to a destination node for the first data transmission according to the IP address of the destination node in the data transmission task. After the first data transmission, the control device operated the destination node for the last data transmission as a source node for the present data transmission, beginning at a second data transmission. The control device then selected a node which had not been selected as a destination node for the present data transmission, from a list of nodes. The source node for the present data transmission transmitted the data to the destination node for the present data transmission, according to the IP address of the destination node, and so on, until all nodes in the list were selected. Normally, all nodes in the list received the data at that time.

Further optionally, on the basis of the technical solution of the above described embodiment, before the step of "the control device operates the destination node for the last data transmission as the source node for the data transmission, when not firstly controlling sending the data", the method further includes the following steps:

(1) the control device periodically receives a data reception progress reported by the destination node for the last data transmission; and (2) the control device determines that the last data transmission has been completed, when the data reception progress received by the control device is 100%.

For example, it can be set that each node successively reports a data transmission progress, e.g., a data reception progress when the node is receiving data (particularly a percentage of the data reception), a data sending progress when the node is sending data (particularly a percentage for sending the data), to the control device, every certain period of time. In particular, each node may report a rate for sending data or a rate for receiving data to the control device, every certain period of time. For example, during data transmission, with the transmission of the data, the destination node for last data transmission periodically reports the progresses of data transmission, such as, 5%, 30%, 66%, 90% and 100%. The control device determines that the last data transmission has been completed, when the data reception progress received by the control device is 100%.

Further optionally, on the basis of the technical solution of the above described embodiment, after the step of "the control device issues a data transmission task to the source node for the data transmission", the method further includes the following steps:

(a) the control device determines that a data reception progress reported by the destination node for the data transmission has not been received within a preset number of periods;

(For example, the preset number of periods may be 6 periods. In practical application, the preset number may be determined based on the duration of each period.)

(b) the control device determines that the destination node for the data transmission is failed;

(c) the control device selects a node having least sub-nodes as the source node for the data transmission, from the original node and nodes which have received the data in the list of nodes;

(d) the control device reselects a node which has not been selected for reception of the data as a destination node for the data transmission, from the list of nodes for receiving the data; and (e) the control device issues a data transmission task to the source node for the data transmission, so that the source node for the data transmission transmits the data to the destination node for the data transmission according to the address of the destination node for the data transmission.

It should be noted that step (c) may be cancelled from the above technical solution. At the moment, when the destination node for the data transmission is failed, the source node for the data transmission may transmit the data to the reselected destination node for the data transmission. However, in this way, the source node for the data transmission may act as source node for several data transmissions. The source node for the data transmission may require more LAN traffic and more CPU occupation, and as a result, each node requires more LAN traffic and the CPU usage is uneven. Therefore, step (c) is added to the technical solution of the embodiment, i.e., the control device selects a node having least sub-nodes as the source node for the data transmission, from the original node and nodes which have received the data in the list of nodes, and then the reselected source node for the data transmission transmits the data to the destination node for the data transmission. By selecting a node having least sub-nodes as the source node for the data transmission, from the original node and nodes which have received the data in the list of nodes, each node may require less LAN traffic and the CPU usage is even, so that the data transmission rate is fast and the data transmission efficiency is high.

Further optionally, on the basis of the technical solution of the above described embodiment, after the step of "the control device issues a data transmission task to the source node for the data transmission", the method further includes the step that it is determined that the data transmission has been completed, if it is determined by the control device that all nodes in the list of nodes except the failed node have received the data.

All optional technical solutions of the above embodiments may be combined with each other to form other optional embodiments of the application, which will not be listed here.

Utilizing the technical solutions of the above embodiments, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solutions of the above embodiments may transmit the data without manual manipulation, so that a control device may effectively control the nodes, the data transmission rate is fast and data transmission efficiency is high. As compared with the second implementation of the prior art, the technical solutions of the above embodiments may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solutions of the above embodiments may be applied to design and implementation of cloud platform. Therefore, the technical solutions of the above embodiments solve the problem of coming on-line, expansion and migration of the virtual host, save a lot of time and provide better experience to users.

Figure 2:
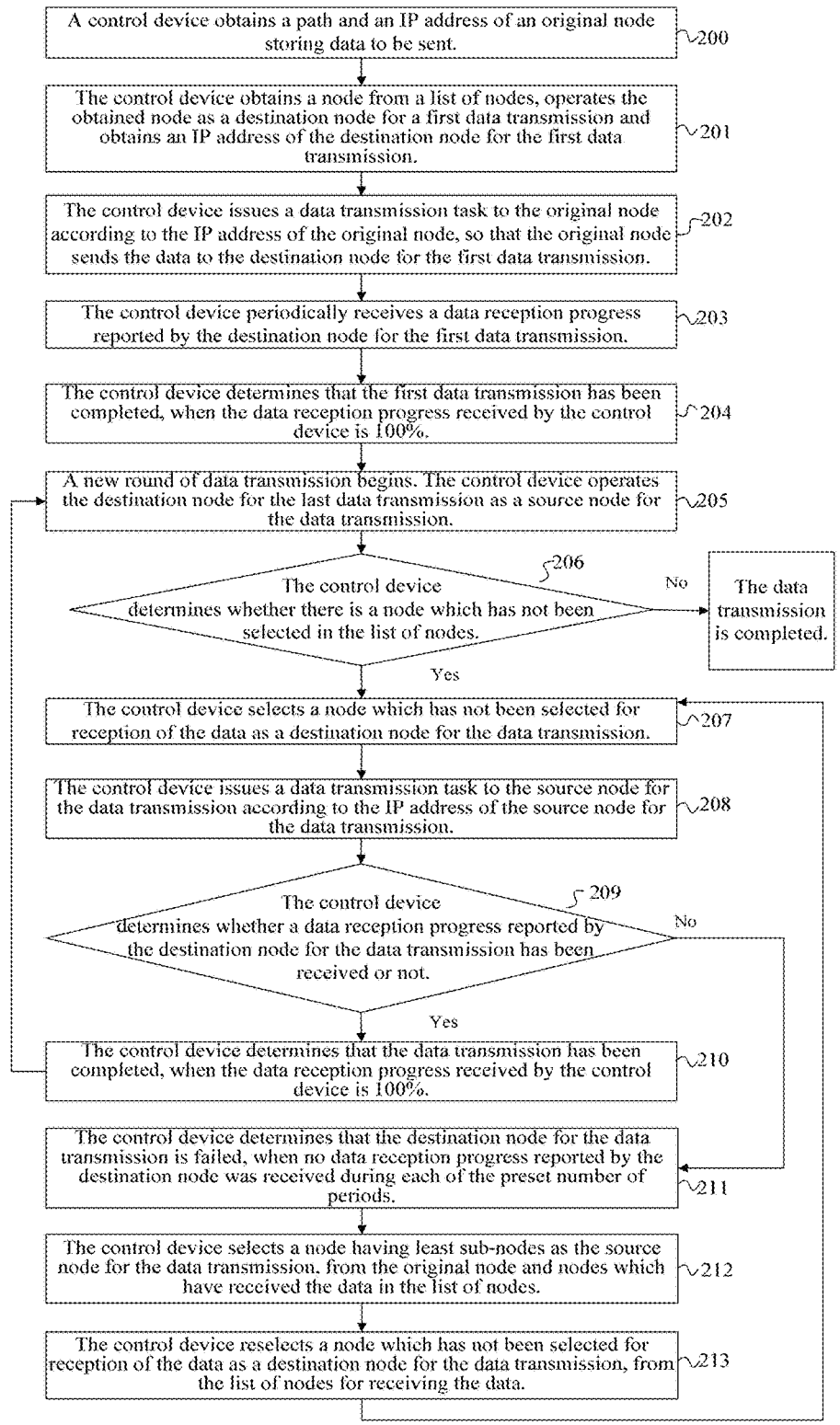
FIG. 2 is a flow diagram of a method for data transmission provided by another embodiment of the application.

FIG. 2 is a flow diagram of a method for data transmission provided by another embodiment of the application. As shown in FIG. 2, on the basis of the technical solutions provided by the optional embodiments of FIG. 1, the method for data transmission of the embodiment may particularly includes the following steps.

200. A control device obtains a path and an IP address of an original node storing data to be sent, proceeding to step 201.

201. The control device obtains a node from a list of nodes, operates the obtained node as a destination node for a first data transmission and obtains an IP address of the destination node for the first data transmission, proceeding to step 202.

The list of nodes of the embodiment is used to accommodate a set of all nodes. The list of nodes includes at least one identifier of the nodes and an address of each node.

202. The control device issues a data transmission task to the original node according to the IP address of the original node, so that the original node sends the data to the destination node for the first data transmission, proceeding to step 203.

The data transmission task includes the IP address of the destination node for the first data transmission and a data storage path in the destination node for the first data transmission. Optionally, the data transmission task may do not include the data storage path in the destination node for the first data transmission; at the moment, the data storage path is determined by the destination node for the first data transmission.

203. The control device periodically receives a data reception progress reported by the destination node for the first data transmission, proceeding to step 204.

For example, the control device may also receive data transmission rate reported by the destination node for the first data transmission and so on.

204. The control device determines that the first data transmission has been completed, when the data reception progress received by the control device is 100%, proceeding to step 205.

205. A new round of data transmission begins. The control device operates the destination node for the last data transmission as a source node for the data transmission, proceeding to step 206.

206. The control device determines whether there is a node which has not been selected in the list of nodes. If there is, the method proceeds to step 207; otherwise, the data transmission is completed.

When the data transmission is completed, all nodes exit the data transmission. In the embodiment, if the node in the list of nodes is selected, the data has been sent to the node.

207. The control device selects a node which has not been selected for reception of the data as a destination node for the data transmission, proceeding to step 208.

208. The control device issues a data transmission task to the source node for the data transmission according to the IP address of the source node for the data transmission, proceeding to step 209.

The data transmission task includes an IP address of the destination node for the data transmission, a data storage path in the source node for the data transmission and a data storage path in the destination node for the data transmission. The source node for the data transmission gains the data from the data storage path in the source node and sends the data to the destination node for the data transmission, and then the destination node for the data transmission stores the data in the data storage path in the destination node. Optionally, the data transmission task may do not include the data storage path in the destination node for the data transmission; instead, the data storage path is determined by the destination node for the data transmission.

209. The control device determines whether a data reception progress reported by the destination node for the data transmission has been received or not. If so, the method proceeds to step 210; otherwise, the method proceeds to step 211.

The destination node for the data transmission periodically reports the data reception progress to the control device.

210. The control device determines that the data transmission has been completed, when the data reception progress received by the control device is 100%, proceeding to step 205.

The control device determines a data reception progress reported by a destination node which has not received the data within a preset number of periods.

211. The control device determines that the destination node for the data transmission is failed, when no data reception progress reported by the destination node was received during the preset number of periods, proceeding to step 212.

At the moment, the control device should adjust the data transmission link in time.

212. The control device selects a node having least sub-nodes as the source node for the data transmission, from the original node and nodes which have received the data in the list of nodes, proceeding to step 213.

213. The control device reselects a node which has not been selected for reception of the data as a destination node for the data transmission, from the list of nodes for receiving the data, proceeding to step 207.

The embodiment implements a chained data distribution scheme using the abovementioned technical solution. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solution provided by the embodiment may transmit the data without manual manipulation, so that a control device may effectively control the nodes, the data transmission rate is fast and data transmission efficiency is high. As compared with the second implementation of the prior art, the technical solution provided by the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution provided by embodiment may be applied to design and implementation of cloud platform. Therefore, the technical solution provided by the embodiment solves the problem of coming on-line, expansion and migration of the virtual host, saves a lot of time and provides better experience to users.

Figure 3:
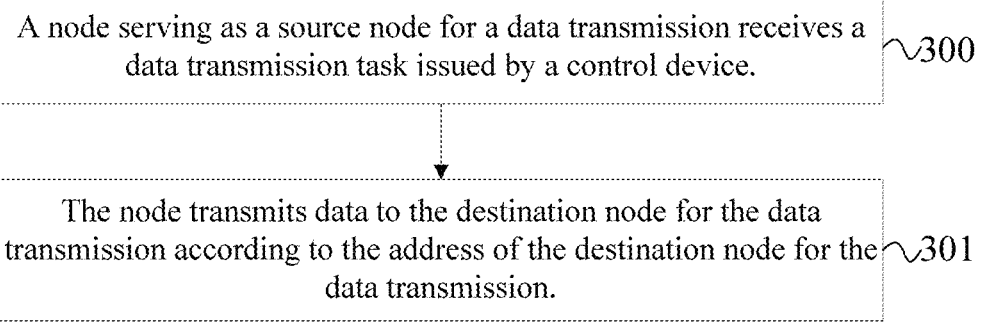
FIG. 3 is a flow diagram of a method for data transmission provided by yet another embodiment of the application.

FIG. 3 is a flow diagram of a method for data transmission provided by yet another embodiment of the application. As shown in FIG. 3, the method for data transmission of the embodiment may particularly include the following steps.

300. A node serving as a source node for the data transmission receives a data transmission task issued by a control device.

The data transmission task includes an identifier of a destination node for the data transmission and an address (such as, an IP address) of the destination node.

301. The node transmits data to the destination node for the data transmission according to the address of the destination node.

The technical solution of the embodiment differs from that of the embodiment shown in FIG. 1 only in that: the embodiment shown in FIG. 1 describes the technical solution of the application at the control device side, while the present embodiment describes the technical solution of the application at the node side. Therefore, detailed description may refer to the related embodiments described above, and is thus omitted.

The embodiment implements a chained data distribution scheme using the abovementioned technical solution. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solution provided by the embodiment may transmit the data without manual manipulation, so that a control device may effectively control the nodes, the data transmission rate is fast and data transmission efficiency is high. As compared with the second implementation of the prior art, the technical solution provided by the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution provided by the embodiment may be applied to design and implementation of cloud platform. Therefore, the technical solution provided by the embodiment solves the problem of coming on-line, expansion and migration of the virtual host, saves a lot of time and provides better experience to users.

Optionally, on the basis of the technical solution of the embodiment shown in FIG. 3, after step 301, the method for data transmission may further include that the node periodically reports data transmission progress to the control device, so that the control device may determine that the data transmission has been completed according to the data transmission progress.

Optionally, on the basis of the technical solution of the embodiments shown in FIG. 3, before step 300, the method for data transmission may further include that the node serves as a destination node for the last data transmission to receive the data sent from the source node for the last data transmission.

Further optionally, after the step of "the node serves as a destination node for the last data transmission to receive the data sent from the source node for the last data transmission" in the above embodiment, the method may further include that the node serves as the destination node for the last data transmission to report data reception progress to the control device, so that the control device may determine that the last data transmission has been completed according to the data reception progress.

Further optionally, on the basis of the technical solution of the above embodiment, the method for data transmission may further include that the node verifies the validity of the data and determines whether the data is correct or not, when the last data transmission has been completed.

All optional technical solutions of the above embodiments may be combined with each other to form other optional embodiments of the application, which will not be listed here.

The technical solutions of the above embodiments differ from those of the embodiment shown in FIG. 1, the optional embodiments and the embodiment shown in FIG. 2 only in that: the embodiment shown in FIG. 1, the optional embodiments and the embodiment shown in FIG. 2 describe the technical solutions of the application at the control device side, while these embodiments describe the technical solutions of the application at the node side. Therefore, detailed description may refer to the related embodiments described above, and is thus omitted.

Utilizing the technical solutions of the above embodiments, data can be rapidly distributed to all nodes within the list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solutions of the above embodiments may transmit the data without manual manipulation, so that a control device may effectively control the nodes, the data transmission rate is fast and data transmission efficiency is high. As compared with the second implementation of the prior art, the technical solutions of the above embodiments may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solutions of the above embodiments may be applied to design and implementation of cloud platform. Therefore, the technical solutions of the above embodiments solve the problem of coming on-line, expansion and migration of the virtual host, save a lot of time and provide better experience to users.

Figure 4:
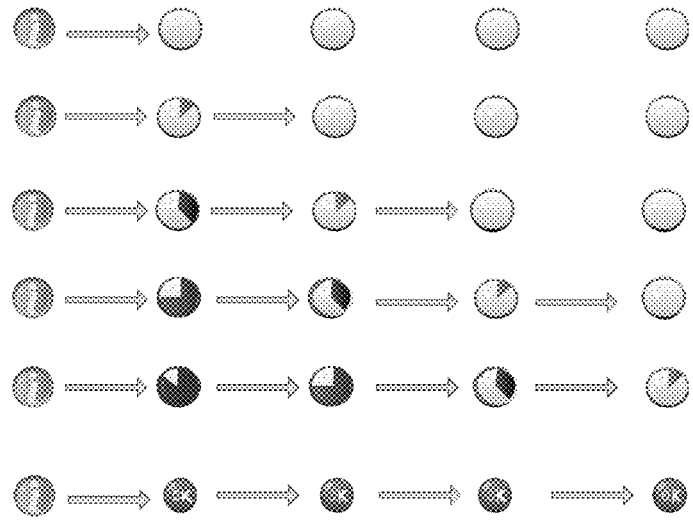
FIG. 4 is an exemplary diagram of data processing provided by an embodiment of the application.
Figure 5:
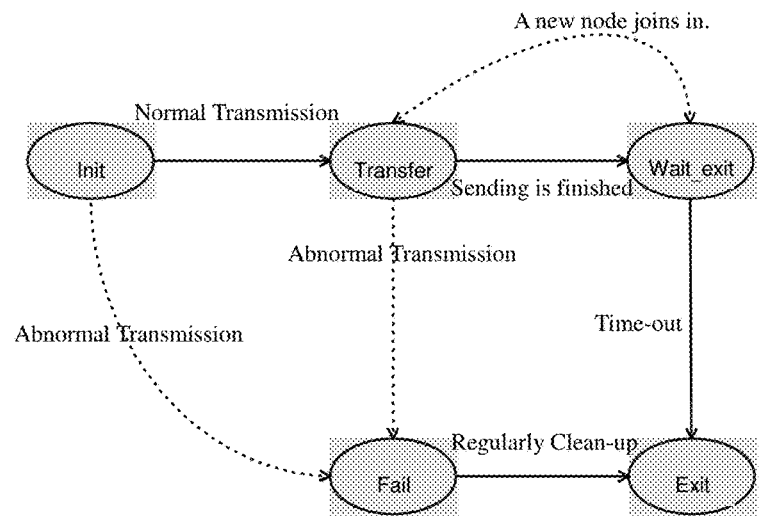
FIG. 5 is state-transition diagram of nodes in the data processing of FIG. 4.
Figure 6:
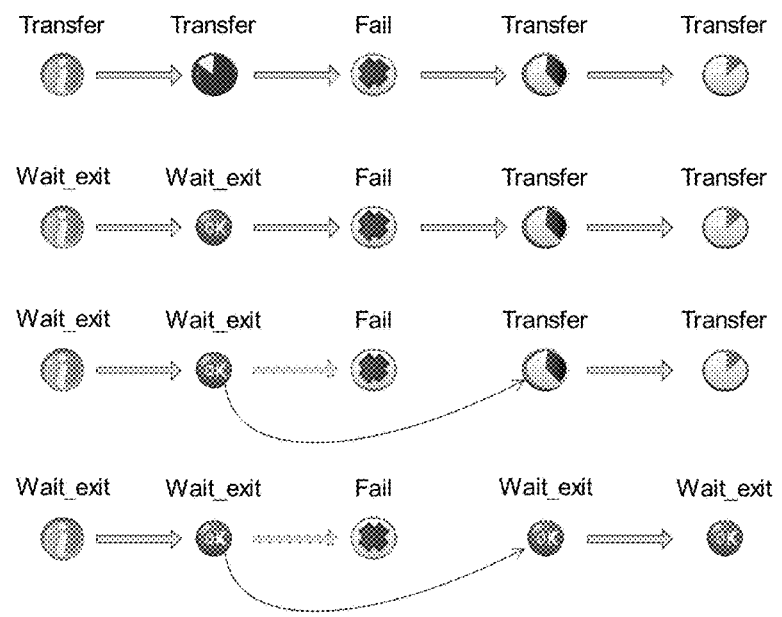
FIG. 6 is another exemplary diagram of data processing provided by an embodiment of the application.
Figure 7:
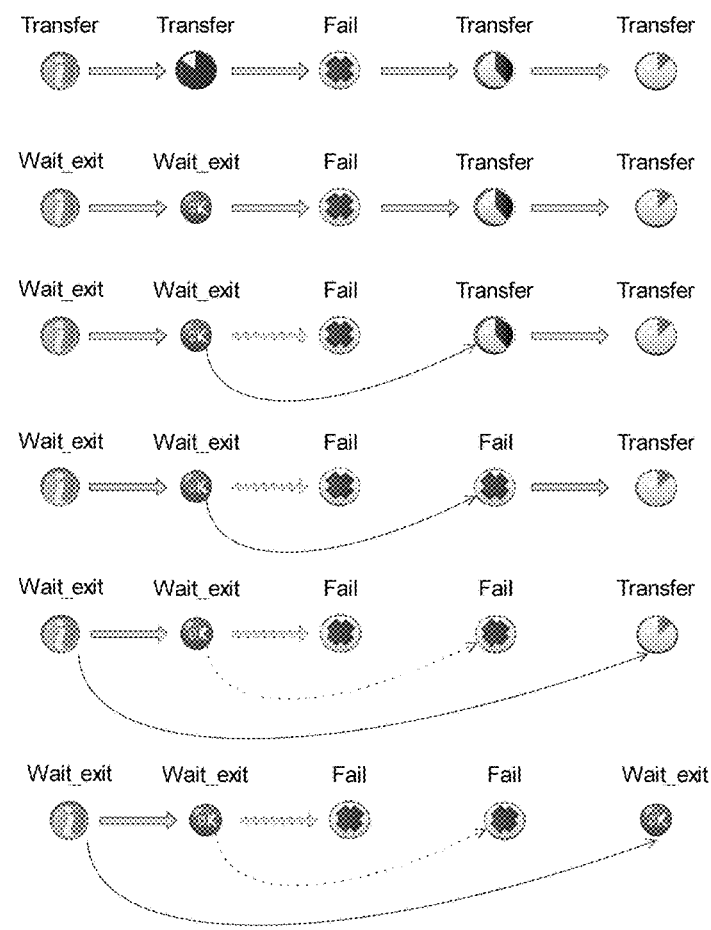
FIG. 7 is another exemplary diagram of data processing provided by an embodiment of the application.

FIG. 4 is an exemplary diagram of data processing provided by an embodiment of the application. FIG. 5 is state-transition diagram of nodes in the data processing of FIG. 4. FIG. 6 is another exemplary diagram of data processing provided by an embodiment of the application. FIG. 7 is another exemplary diagram of data processing provided by an embodiment of the application. As shown in FIGS. 4-7, in order to describe the technical solutions of the application, the case that five nodes includes one source node and four nodes which may serve as destination nodes and the control device is a Controller is taken as an example. As shown in FIG. 4, FIG. 6 and FIG. 7, in every line, the first node is the source node, and the second node, the third node, the fourth node and the fifth node may serve as destination nodes respectively. Each node has a module for data transmission, which may be called a transmission unit (Peer).

The transmission unit (Peer) on each node implements the following functions:

1) receiving a data transmission task issued by the Controller, and sending data to a destination node;

2) receiving data sent from Peers on other nodes and writing the received data into a local file; and verifying the validity of the data;

3) synchronizing task progress with the Peer on the destination node and resending the data regularly, so as to ensure that the destination node receives the entire and correct data;

4) reporting the rate or percent for sending the data or receiving data of the node to the Controller regularly.

The control device (Controller) implements the following functions:

1) receiving a data transmission task requested by a user utilizing a tool, and gaining a file path, the source node and all destination nodes of the task;

2) selecting a destination node, and issuing the task to the Peer on the source node to make it send data to the selected node; forming a transmission chain;

3) processing report from each Peer of the node on the transmission chain;

4) when the last node on the transmission chain receives a certain amount of data, operating the last node as a source node, selecting a node from the rest destination nodes, issuing a task and adding the newly selected node to the current transmission chain;

5) repeating the above progress, until all nodes are added to the transmission chain;

6) switching timely, when a node abnormally transmits, to keep the transmission normal and the heat even;

7) making the nodes exit successively after the transmission is completed;

8) the source node of the task always exists finally; and 9) marking that the task has been completed after all nodes have exited; and clear the task.

According to the functions of the control device (Controller) and the Peer of each node, in the first line of FIG. 4, the source node and the second node in the first line compose a transmission chain, and the source node transmits data to the second node in the first line. When the transmission is success, as shown in the second line of FIG. 4, the third node in the second line joins in the transmission chain, and the second node in the second line transmits the data to the third node in the second line. When the transmission is success, as shown in the third line of FIG. 4, the fourth node in the third line joins in the transmission chain, and the third node in the third line transmits the data to the fourth node in the third line. By parity of reasoning, as shown in the sixth line of FIG. 4, the fifth node joins in the transmission chain, and the fourth node transmits the data to the fifth node.

FIG. 4 shows a situation when all nodes normally transmit the data. In practice, certain node may be abnormal, leading to the transmission chain breaking off. As a result, nodes following the abnormal one stay "hungry" for not receiving the data, and the task cannot finish. Taking everything into consideration, Table 1 shows various statuses of the nodes along with their description, and transition of the statuses. Table 1 is as follows:

| Status | Description |
| --- | --- |
| Init | Initial status: the data received by the node still cannot be transmitted to the next node; |
| Transfer | Transfer status: the node is receiving data and may serve as a source node to transmit the received data (i.e., the node is a leaf node); |
| Wait_exit | Waiting for exit: the node has finished receiving and sending the data, and may serve as a source node to transmit the received data; |
| Exit | Exit: the node has exited and may not serve as a source node to transmit the received data; |
| Fail | The node is failed. |

Therefore, transition of the statuses of the node as shown in FIG. 5 may be achieved according to Table 1.

Based on data reports of the nodes, the Controller makes the following determinations:

1) if a node reports in each period and its transmission progress updates, the node is normally transmitting;

2) if a node continuously reports preset times (such as, 6 times) and its data reception progress is always the same, transmission of the node is suspended;

3) if the Controller does not receive data reports from a node during a preset number of periods (such as, 6 periods), transmission of the node is time-out.

As shown in Table 1 and FIGS. 5-7, if transmission of a node is time-out, its status is set as "failed". Then, nodes following the failed node are determined as "suspended".

As a suspended node keeps reporting to the Controller, a node right before the suspended node on the transmission chain is a failed node. At the moment, a transmission chain switch is activated. As shown in FIG. 6 and FIG. 7, the Controller achieves all nodes in the Wait_exit status, compares the number of sub-nodes of each node, selects a node with least sub-nodes and rebuilds a transmission chain based on the selected node, so as to keep heat of the nodes as even as possible.

Technical solution of the present embodiment implements a chained data distribution scheme. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the technical solution provided by the embodiment may transmit the data without manual manipulation, so that a control device may effectively control the nodes, the data transmission rate is fast and data transmission efficiency is high. As compared with the second implementation of the prior art, the technical solution provided by the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution provided by the embodiment may be applied to design and implementation of cloud platform. Therefore, the technical solution provided by the embodiment solves the problem of coming on-line, expansion and migration of the virtual host, saves a lot of time and provides better experience to users.

Figure 8:
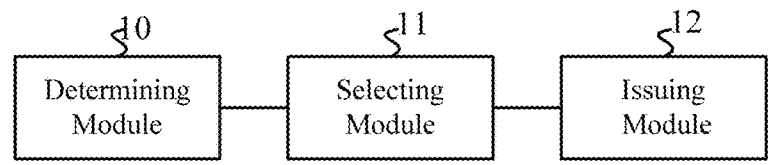
FIG. 8 is a structural schematic diagram of a control device provided by an embodiment of the application.

FIG. 8 is a structural schematic diagram of a control device provided by an embodiment of the application. As shown in FIG. 8, the control device of the embodiment includes a determining module 10, a selecting module 11 and an issuing module 12.

The determining module 10 is used to determine a source node for a data transmission. The selecting module 11 is used to select a node which has not been selected for reception of the data as a destination node for the data transmission, from a list of nodes for reception of the data, wherein the destination node serves as the next nearest node on a transmission chain. The list of nodes includes at least one identifier of each of nodes for reception of the data and address of each node. The issuing module 12 respectively connects to the determining module 10 and the selecting module 11. The issuing module 12 is used to issue a data transmission task to the source node for the data transmission according to the source node for the data transmission determined by the determining module 10 and the destination node for the data transmission selected by the selecting module 11, wherein the data transmission task includes the identifier of the destination node for the data transmission and the address of the destination node for the data transmission, so that the source node for the data transmission transmits the data to the destination node for the data transmission according to the address of the destination node for the data transmission.

The control device of the embodiment performs data processing using the above-mentioned modules, implementation mechanism of which is the same as the related method embodiment. Therefore, detailed description may refer to the related embodiment described above, and is thus omitted.

The control device of the present embodiment implements a chained data distribution scheme using the above-mentioned modules. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the data may be transmitted without manual manipulation, and the control device may effectively control the nodes, keeping the data transmission rate fast and data transmission efficiency high. As compared with the second implementation of the prior art, the control device may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution of the above embodiment may be applied to design and implementation of cloud platform. Therefore, the technical solution of the above embodiment solves the problem of coming on-line, expansion and migration of the virtual host, saves a lot of time and provides better experience to users.

Figure 9:
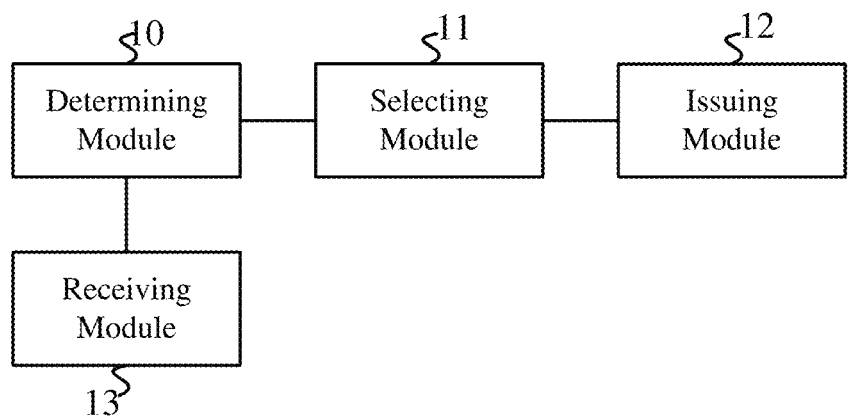
FIG. 9 is a structural schematic diagram of a control device provided by another embodiment of the application.

FIG. 9 is a structural schematic diagram of a control device provided by another embodiment of the application. As shown in FIG. 9, the control device of the embodiment provides the following technical solution, on the basis of the embodiment shown in FIG. 8.

As shown in FIG. 9, the determining module 10 in the control device of the embodiment is particularly used to determine that the source node for the data transmission is an original node storing the data before the data was sent, when the control device firstly controls sending the data.

Optionally, the determining module 10 in the control device of the embodiment is particularly used to operate the destination node for the last data transmission as the source node for the data transmission, when the control device does not firstly control sending the data.

Optionally, as shown in FIG. 9, the control device of the embodiment further includes a receiving module 13. The receiving module 13 is used to periodically receives a data reception progress reported by the destination node for the last data transmission, before that the determining module 10 operates the destination node for the last data transmission as the source node for the data transmission, when the control device does not firstly control sending the data. The determining module 10 is connected to the receiving module 13. The determining module 10 is further used to determine that the last data transmission has been completed, when the data reception progress received by the receiving module 13 is 100%.

Optionally, as shown in FIG. 9, the determining module 10 in the control device of the embodiment is further used to determine a data reception progress reported by the destination node for the data transmission has not been received within a preset number of periods, after that the issuing module 12 issues a data transmission task to the source node for the data transmission. The determining module 10 is also used to determine the destination node for the data transmission is failed. The selecting module 11 is further used to select a node having least sub-nodes as the source node for the data transmission, from the original node and nodes which have received the data in the list of nodes. The selecting module 11 is also used to reselect a node which has not been selected for reception of the data as a destination node for the data transmission, from the list of nodes for receiving the data. The issuing module 12 is used to issue a data transmission task to the source node for the data transmission, so that the source node for the data transmission transmits the data to the destination node for the data transmission according to the address of the destination node for the data transmission.

Optionally, as shown in FIG. 9, the determining module 10 in the control device of the embodiment is further used to determine that all nodes in the list of nodes except the failed node have received the data, after that the issuing module 12 issues a data transmission task to the source node for the data transmission, and then determine that the data transmission is completed.

All optional technical solutions of the above embodiments may be combined with each other to form other optional embodiments of the application, which will not be listed here.

The control device of the embodiment performs data processing using the above-mentioned modules, implementation mechanism of which is the same as the related method embodiment. Therefore, detailed description may refer to the related method embodiment described above, and is thus omitted.

The control device of the present embodiment implements a chained data distribution scheme using the above-mentioned modules. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the data may be transmitted without manual manipulation, and the control device may effectively control the nodes, keeping the data transmission rate fast and data transmission efficiency high. As compared with the second implementation of the prior art, the control device may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution of the above embodiment may be applied to design and implementation of cloud platform. Therefore, the technical solution of the above embodiment solves the problem of coming on-line, expansion and migration of the virtual host, saves a lot of time and provides better experience to users.

Figure 10:
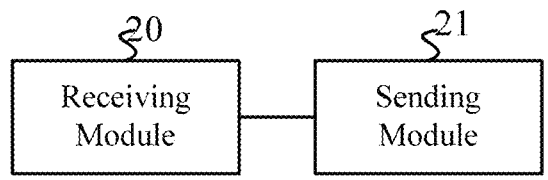
FIG. 10 is a structural schematic diagram of a node device provided by an embodiment of the application.

FIG. 10 is a structural schematic diagram of a node device provided by an embodiment of the application. As shown in FIG. 10, the node device of the embodiment may particularly include a receiving module 20 and a sending module 21.

The receiving module 20 is used to receive a data transmission task issued by a control device, when the node device serves as a source node for the data transmission. The data transmission task includes an identifier of a destination node for the data transmission and an address of the destination node for the data transmission. The sending module 21 is connected to the receiving module 20. The sending module 21 is used to transmit data to the destination node for the data transmission, according to the data transmission task received by the receiving module 20 and the address of the destination node for the data transmission.

The node device of the embodiment performs data processing using the above-mentioned modules, implementation mechanism of which is the same as the related method embodiment. Therefore, detailed description may refer to the related method embodiment described above, and is thus omitted.

The node device of the present embodiment implements a chained data distribution scheme using the above-mentioned modules. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the data may be transmitted without manual manipulation, and the node device may be effectively controlled by a control device, keeping the data transmission rate fast and data transmission efficiency high. As compared with the second implementation of the prior art, the technical solution of the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution of the above embodiment may be applied to design and implementation of cloud platform. Therefore, the technical solution of the above embodiment solves the problem of coming on-line, expansion and migration of the virtual host, saves a lot of time and provides better experience to users.

Figure 11:
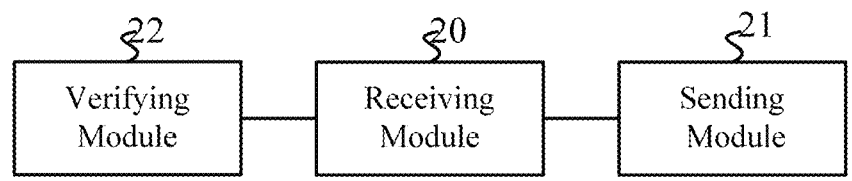
FIG. 11 is a structural schematic diagram of a node device provided by another embodiment of the application.

FIG. 11 is a structural schematic diagram of a node device provided by another embodiment of the application. As shown in FIG. 11, the node device of the embodiment provides the following technical solution, on the basis of the embodiment shown in FIG. 10.

After transmitting data to the destination node for the data transmission according to the address of the destination node for the data transmission, the sending module 21 is further used to periodically report a data transmission progress to the control device, so that the control device may determine whether the data transmission is completed according to the data transmission progress.

Optionally, the receiving module 20 is further used to receive data sent from the source node for the last data transmission, when the node device serves as a destination node for the last data transmission, before receiving the data transmission task issued by the control device, when the node device serves as the source node for the data transmission.

Optionally, when the node device serves as a destination node for the last data transmission, the sending module 21 is further used to report the data reception progress to the control device, after that the receiving module 20 receives data sent from the source node for the last data transmission, so that the control device may determine whether the data transmission is completed according to the data transmission progress.

Optionally, as shown in FIG. 11, the node device of the embodiment further includes a verifying module 22. The verifying module 22 is connected to the receiving module 20. When the node device serves as a destination node for the last data transmission, the verifying module 22 is used to verify the validity of the data and determine whether the data is correct or not.

The node device of the embodiment performs data processing using the above-mentioned modules, implementation mechanism of which is the same as the related method embodiment. Therefore, detailed description may refer to the related method embodiment described above, and is thus omitted.

The node device of the present embodiment implements a chained data distribution scheme using the above-mentioned modules. Utilizing the chained data distribution scheme, data can be rapidly distributed to all nodes within a list of nodes. Normally, each node has the same heat, i.e., the data is only received once and distributed once. As each node has the same heat, the LAN traffic required by each node for data transmission and usage of CPU are even, so that the data transmission rate is fast and data transmission efficiency is high. As compared with the first implementation of the prior art, the data may be transmitted without manual manipulation, and the node device may be effectively controlled by a control device, keeping the data transmission rate fast and data transmission efficiency high. As compared with the second implementation of the prior art, the technical solution of the embodiment may assure that the heat of each node as even as possible, i.e., the LAN traffic required by each node for data transmission and usage of CPU are even, so that when a large file needs to be transmitted, the data transmission rate is still fast and data transmission efficiency is still high. For example, as the generation of a virtual host depends on fast replication of image files, the technical solution of the above embodiment may be applied to design and implementation of cloud platform. Therefore, the technical solution of the above embodiment solves the problem of coming on-line, expansion and migration of the virtual host, saves a lot of time and provides better experience to users.

Figure 12:
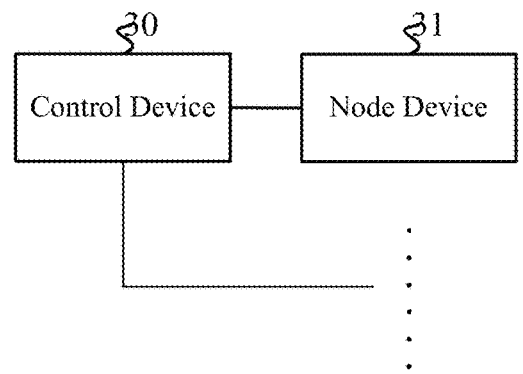
FIG. 12 is a structural schematic diagram of a system for data transmission provided by an embodiment of the application.

FIG. 12 is a structural schematic diagram of a system for data transmission provided by an embodiment of the application. As shown in FIG. 12, the system for data transmission of the embodiment includes a control device 30 and at least one node device 31. The control device 30 is connected to the at least one node device 31 to control the at least one node device 31. The control device 30 may be the control device of the embodiments as shown in FIG. 8 or FIG. 9. And the node device 31 may be the node device of the embodiments as shown in FIG. 10 or FIG. 11. For example, the at least one node device 31 may adopt the strictures as shown in FIG. 4, FIG. 6 or FIG. 9. The data processing may be implemented by the methods for data processing of the embodiments as shown in FIGS. 1-3. Therefore, detailed description may refer to the related embodiments described above, and is thus omitted.

It should be noted that the control device and the node device in the above embodiment of maybe in one terminal equipment.

Figure 13:
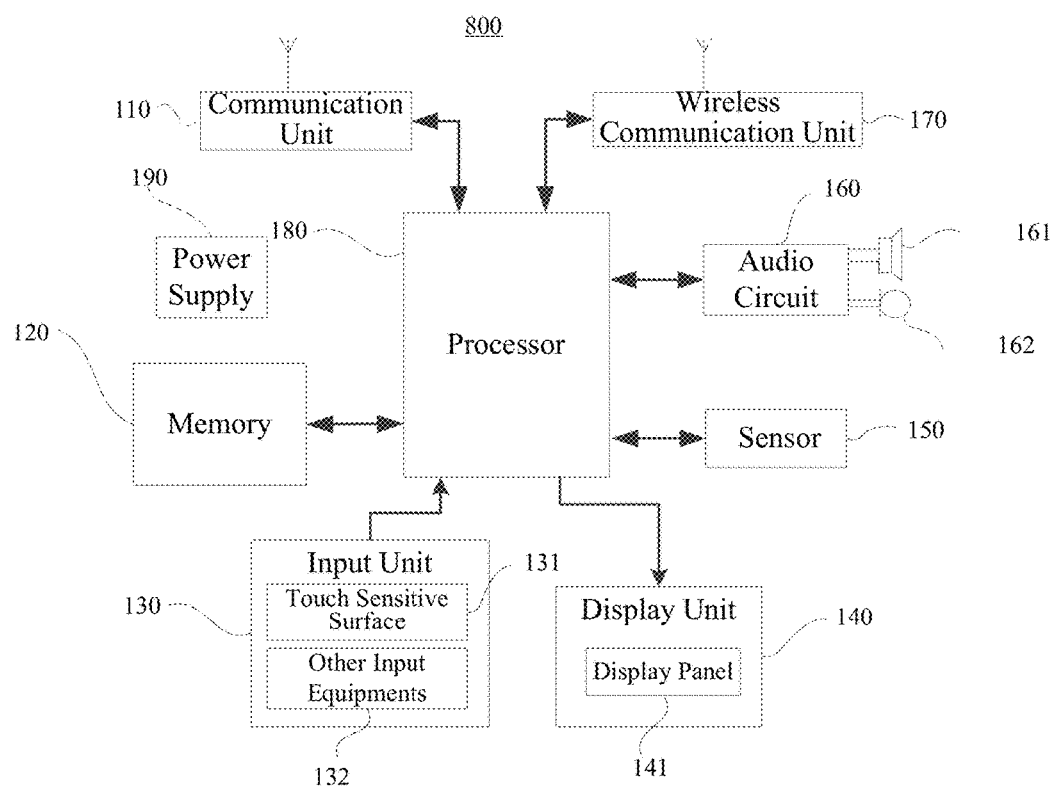
FIG. 13 is a structural schematic diagram of a terminal equipment provided by an embodiment of the application.

FIG. 13 is a structural schematic diagram of terminal equipment provided by an embodiment of the application. Referring to FIG. 13, the terminal equipment may be used to implement the data transmission methods provided in the above embodiments.

In particular, the terminal equipment 800 may include a communication unit 110, a memory 120 including one or more computer-readable storage media, an input unit 130, a display unit 140, a sensor 150, an audio circuit 160, a wireless fidelity (WiFi) module 170, a processor including one or more processing cores, a power supply 190 and so on. Those skilled in the art may understand that the structure of the terminal equipment as shown in FIG. 13 is not intended to define the terminal equipment, and that the terminal equipment may include more or less components than those shown in FIG. 13, some of which may be combined together or arranged differently.

The communication unit 110 may be used to receive or send signals during receiving or sending a message or making a call. The communication unit 110 may be a Radio Frequency (RF) circuit, a router, a modem and other network communication equipments. In particular, when the communication unit 110 is a RF circuit, it receives downlink information from a base station, and the received information is then processed by one or more processors 180; additionally, the communication unit 110 sends data related to uplink to the base station. Generally, the RF circuit serving as the communication unit 110 includes but not limited to an antenna, at least one amplifier, a tuner, one or more oscillators, a subscriber identity module (SIM), a transceiver, a coupler, a low noise amplifier (LNA), a duplexer and so forth. Further, the communication unit 110 may communicate with other equipments via wireless communication or network. The wireless communication may use any communication standards or protocols including but not limited to Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), etc. The memory 120 may be used to store software programs and modules. The processor 180 performs a variety of function application and data processing by operating the software programs and modules stored in the memory 120. The memory 120 may mainly include an area for storing programs and an area for storing data; wherein the area for storing programs may store an operating system and an application program required by at least one function (such as, an audio play function and a video play function), and so on; the area for storing data may store data created according to the usage of the terminal equipment 800 (such as, audio data, a telephone book), and so on. Additionally, the memory 120 may include a high speed random access memory and a non-volatile memory (such as, at least one magnetic disk storage device, a flash storage device, or other non-volatile solid storage devices). Correspondingly, the memory 120 may also include a memory controller to provide access to the memory 120 for the processor 180 and the input unit 130.

The input unit 130 may be used to receive the input data or character information, and generate signals input by a keyboard, a mouse, an action bar, an optical input equipment or a trackball. Particularly, the input unit 130 may include a touch sensitive surface 131 and other input equipments 132. The touch sensitive surface 131, also called a touch display screen or a touch pad, may collect the user's touch operations thereon or nearby (for example, operations on or round the touch sensitive surface 131 by the user using a finger or a touch pen), and drive corresponding connecting device according to a preset program. Optionally, the touch sensitive surface 131 may include both a touch detecting device and a touch controller. The touch detecting device detects the user's touch location and signal caused by the touch operation, and communicates the signal to the touch controller; the touch controller receives the touch information from the touch detecting device, transforms the received information into touch point coordinates, and then transfers the touch point coordinates to the processor 180, and the touch controller may also receive commands sent from the processor 180 and then perform the commands. Additionally, the touch sensitive surface 131 may be implemented in variety types, such as, resistance-type, capacitance-type, infrared, surface acoustic wave (SAW), and so on. In addition to the touch sensitive surface 131, the input unit 130 may also include other input equipments 132. Particularly, other input equipments 132 may include but not limited to one or more of a physical keyboard, a function key (e.g., a audio control key, a switch key etc.), a trackball, a mouse, a action bar, and so on.

The display unit 140 may be used to information entered by the user or information provided to the user, and a variety of Graphical User Interfaces (GUI) (which may be composed of graphics, texts, icons, videos or any combination of them) of the terminal equipment 800. The display unit 140 may include a display panel 141. Optionally, the display panel 141 may be configured as a Liquid Crystal Display (LCD), an Organic Light-Emitting Diode (OLED) etc. Furthermore, the touch sensitive surface 131 may cover the display panel 141. When the touch sensitive surface 131 detects the touch operations thereon or nearby, it will transfer the touch operations to the controller 180 to determine a type of the touch event; and the controller 180 then provides corresponding visual output on the display panel 141 according to the type of the touch event. Although, the touch sensitive surface 131 and the display panel 141 are two independent components to respectively implement input function and output function as shown in FIG. 13, in some embodiments, the touch sensitive surface 131 and the display panel 141 may be integrated together to implement both the input function and the output function.

The terminal equipment 800 may also include at least one sensor 150, such as, a light sensor, a motion sensor and other sensors. Particularly, the light sensor may include an ambient light sensor and a proximity sensor. Wherein the ambient light sensor may adjust brightness of the display panel 141 according to intensity of the ambient light; the proximity sensor may turn off the display panel 141 and/or backlight, when the terminal equipment 800 moves close to the user's ear. A gravity acceleration sensor, as a kind of motion sensor, may detect magnitude of the acceleration in each direction (generally three-axis). When the terminal equipment 800 is static, the gravity acceleration sensor may detect magnitude and direction of the gravity. The gravity acceleration sensor may be used in applications for indentifying gestures of the mobile phone (such as, a switch between a landscape mode and a portrait mode, related games and a magnetometer calibration), and functions related to vibration recognition (such as, a pedometer and a knocking function) etc. The terminal equipment 800 may also be configured with a gyroscope, a barometer, a hygrometer, a thermometer, an infrared sensor and other sensors, which will not be described here.

An audio circuit 160, a loudspeaker 161 and a microphone 162 may provide an audio interface between the user and the terminal equipment 800. The audio circuit 160 may receive audio data, transform the received audio data into electrical signals, and transmit the electrical signals to the loudspeaker 161; the loudspeaker 161 may transform the electrical signals into sound signals for output; on the other hand, the microphone 162 may transform the received sound signals into electrical signals; the audio circuit 160 may receive the electrical signals, transform them into audio data, and output the audio data to the processor 180 for processing; the processed audio data may be sent to another terminal equipment or the memory 120 for further processing via the RF circuit 110. The audio circuit 160 may further include an earplug jack to provide communications between peripheral earphones with the terminal equipment 800.

In order for wireless communication, the terminal equipment may be configured with a wireless communication unit 170, which may be a WiFi module. The terminal equipment 800 may help the user to receive and send emails, browse webpage and access streaming media via the wireless communication unit 170. The wireless communication unit 170 provides a wireless wideband Internet access for the user. Although the wireless communication unit 170 has been shown in FIG. 13, it may be understood that the wireless communication unit 170 is not a necessary component of the terminal equipment 800, which may be omitted as appropriate and without departing from the scope of essence of the application.

The processor 180 is a control center for the terminal equipment 800. The processor 180 connects each part of the whole terminal equipment using a variety of interfaces and lines. The processor 180 performs a variety of functions of the terminal equipment 800 and processes data, by operating or performing the software programs and/or modules stored in the memory 120 and invoking data stored in the memory 120, so as to monitor the whole terminal equipment. Optionally, the processor 180 may include one or more processing cores. In certain embodiments, an application processor and a modem processor may be integrated into the processor 180. Wherein the application processor mainly processes operating systems, user interfaces and application programs, etc.; the modem processor mainly processes wireless communications. It should be understood that the modem processor may do not be integrated into the processor 180.

The terminal equipment 800 may also include a power supply 190 (such as, a battery) to supply power to each component. In certain embodiments, the power supply may be logically connected with the processor 180 via a power management system, so that functions, such as, Charge, discharge, and power consumption management, may be managed by the power management system. The power supply 190 may further include one or more AC or DC power supplies, a recharging system, a power failure detection circuit, a power converter or inverter, a power status indicator, and any other components.

The terminal equipment 800 may also include a camera and a Bluetooth module (not shown), which will not be described here. In the embodiment, the display unit of the terminal device is a touch screen display. The terminal device includes a memory and one or more programs. Wherein the one or more programs are stored in the memory and configured to contain instructions to be performed by one or more processors to conduct the following operations:

determining, by the control device, a source node for a data transmission;

selecting, by the control device, a node which has not been selected for reception of the data as a destination node for the data transmission, from a list of nodes for the reception of the data, wherein the destination node for the data transmission serves as the next nearest node of the source node for the data transmission on a transmission chain; wherein the list of nodes comprises at least one identifier of each of the nodes for the reception of the data and an address of each node; and issuing, by the control device, a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission.

Optionally, the memory is also used to store the following instructions: determining that the source node for the data transmission is an original node storing the data before the data was sent, when the control device firstly controls sending the data.

Optionally, the memory is also used to store the following instructions: operating the destination node for the last data transmission as the source node for the data transmission, when the control device does not firstly control sending the data.

Optionally, the memory is also used to store the following instructions: periodically receiving, by the control device, a data reception progress reported by the destination node for the last data transmission; and determining, by the control device, that the last data transmission has been completed, when the data reception progress received by the control device is 100%.

Optionally, the memory is also used to store the following instructions: determining, by the control device, that a data reception progress reported by the destination node for the data transmission has not been received within a preset number of periods;

determining, by the control device, that the destination node for the data transmission is failed;

selecting, by the control device, a node having least sub-nodes as the source node for the data transmission, from the original node and nodes which have received the data in the list of nodes;

reselecting, by the control device, a node which has not been selected for reception of the data as a destination node for the data transmission, from the list of nodes for receiving the data; and issuing, by the control device, a data transmission task to the source node for the data transmission, so that the source node for the data transmission transmits the data to the destination node for the data transmission according to the address of the destination node for the data transmission.

Optionally, the memory is also used to store the following instructions: determining that the data transmission has been completed, if it is determined by the control device that all nodes in the list of nodes except the failed node have received the data.

On the other aspect, the memory in the terminal device may also be used to store the following instructions: receiving a data transmission task issued by a control device, wherein the data transmission task includes an identifier of a destination node for the data transmission and an address of the destination node for the data transmission;

transmitting data to the destination node for the data transmission according to the address of the destination node for the data transmission.

Optionally, the memory is also used to store the following instructions: periodically reporting data transmission progress to the control device, so that the control device may determine whether the data transmission has been completed or not according to the data transmission progress.

Optionally, the memory is also used to store the following instructions: receiving the data sent from the source node for the last data transmission.

Optionally, the memory is also used to store the following instructions: reporting data reception progress to the control device, so that the control device may determine whether the last data transmission has been completed or not according to the data reception progress.

Optionally, the memory is also used to store the following instructions: verifying validity of the data and determines whether the data is correct or not, when the last data transmission has been completed.

What should be noted is that: when processing data, the control device and node device provided by the above embodiments take the above function modules as examples for illustration. In the practical application, the above functions may be assigned to different modules as required, i.e., the internal structure of the device may be divided into different function modules to implement all or a part of the functions. Additionally, the control device and node device provided by the above embodiments belong to the same conception as the data processing method embodiments, detailed implementations of which may refer to the method embodiments and is thus omitted.

The reference numbers of the embodiments of the application are merely for description and are not indicating pros and cons of the embodiments.

Those skilled in the art may understand that all or a part of the steps of the above embodiments may be implemented by hardware, or be implemented by programs instructing the related hardware. All the programs may be stored in a computer readable medium, such as, a read-only memory, a magnetic disk or an optical disk, etc.

The above described embodiments are merely preferred embodiments of the application, but not intended to limit the application. Any modifications, equivalent alternations and improvements that are made within the spirit and scope of the application should be included in the protection scope of the application.

What is claimed is:

1. A method for data transmission, wherein the method comprises the steps of:

determining, by a control device, a source node for the data transmission, wherein when the control device firstly controlling sending data, the source node for the data transmission is an original node storing the data before the data is sent;

selecting, by the control device, a node which has not been selected for reception of the data as a destination node for the data transmission, from a list of nodes for the reception of the data, wherein the destination node for the data transmission serves as a next nearest node of the source node for the data transmission on a transmission chain, and reports a data reception progress about the last data transmission for the control device; wherein the list of nodes comprises at least one identifier of each of the nodes for the reception of the data and an address of each of the nodes; and issuing, by the control device, a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission.

2. The method according to claim 1, wherein the step of determining, by the control device, the source node for the data transmission comprises:

operating, by the control device, a destination node for last data transmission as the source node for the data transmission, if the control device has ever controlled sending of the data.

3. The method according to claim 2, wherein before the step of operating the destination node for the last data transmission as the source node for the data transmission, the method further comprises:

periodically receiving, by the control device, a data reception progress reported by the destination node for the last data transmission; and determining, by the control device, that the last data transmission has been completed, when the data reception progress received by the control device is 100%.

4. The method according to claim 1, wherein after the step of issuing, by the control device, the data transmission task to the source node for the data transmission, the method further comprises:

determining, by the control device, that a data reception progress reported by the destination node for the data transmission has not been received within a preset number of periods;

determining, by the control device, that the destination node for the data transmission is failed;

selecting, by the control device, a node having least sub-nodes as the source node for the data transmission, from the original node and nodes which have received the data in the list of nodes;

reselecting, by the control device, a node which has not been selected for reception of the data as the destination node for the data transmission, from the list of nodes for the reception of the data; and issuing, by the control device, a data transmission task to the source node for the data transmission, so that the source node for the data transmission transmits the data to the reselected destination node for the data transmission according to the address of the reselected destination node for the data transmission.

5. The method according to claim 1, wherein the method further comprises:

determining that the data transmission has been completed, if it is determined by the control device that all nodes in the list of nodes except the failed node have received the data.

6. A control device, wherein the device comprises:

a determining module, configured to determine a source node for a data transmission, wherein when the control device firstly controlling sending data, the source node for the data transmission is an original node storing the data before the data is sent;

a selecting module, configured to select a node which has not been selected for reception of the data as a destination node for the data transmission, from a list of nodes for the reception of the data, wherein the destination node for the data transmission serves as a next nearest node of the source node for the data transmission on a transmission chain, and reports a data reception progress about the last data transmission for the control device; wherein the list of nodes comprises at least one identifier of each of the nodes for the reception of the data and an address of each of the nodes; and an issuing module, configured to issue a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission.

7. The device according to claim 6, wherein the determining module is particularly configured to operate a destination node for last data transmission as the source node for the data transmission, if the control device has ever controlled sending of the data.

8. The device according to claim 7, wherein the device further comprises a receiving module, wherein:

the receiving module is configured to periodically receive data reception progress reported by the destination node for the last data transmission, before the determining module operates the destination node for the last data transmission as the source node for the data transmission; and the determining module is further configured to determine that the last data transmission has been completed, when the received data reception progress is 100%.

9. The device according to claim 6, wherein:

the determining module is further configured to determine that a data reception progress reported by the destination node for the data transmission has not been received within a preset number of periods, after the issuing module issues the data transmission task to the source node for the data transmission;

the determining module is further configured to determine that the destination node for the data transmission is failed;

the selecting module is further configured to select a node having least sub-nodes as the source node for the data transmission, from the original node and nodes which have received the data in the list of nodes;

the selecting module is further configured to reselect a node which has not been selected for reception of the data as the destination node for the data transmission, from the list of nodes for the reception of the data; and the issuing module is further configured to issue a data transmission task to the source node for the data transmission, so that the source node for the data transmission transmits the data to the reselected destination node for the data transmission according to the address of the reselected destination node for the data transmission.

10. The device according to claim 6, wherein the determining module is further configured to determine that the data transmission has been completed, if it is determined that all nodes in the list of nodes except the failed node have received the data.

11. A system for data transmission, comprising a control device and at least one node device, wherein the control device comprises:

a determining module, configured to determine a source node for a data transmission, wherein when the control device firstly controlling sending data, the source node for the data transmission is an original node storing the data before the data is sent;

a selecting module, configured to select a node which has not been selected for reception of the data as a destination node for the data transmission, from a list of nodes for the reception of the data, wherein the destination node for the data transmission serves as a next nearest node of the source node for the data transmission on a transmission chain, and reports a data reception progress about the last data transmission for the control device; wherein the list of nodes comprises at least one identifier of each of the nodes for the reception of the data and an address of each of the nodes; and an issuing module, configured to issue a data transmission task to the source node for the data transmission, wherein the data transmission task comprises the identifier of the destination node for the data transmission and the address of the destination node for the data transmission, so that the source node for the data transmission transmits the data to the destination node for the data transmission according to the address of the destination node for the data transmission;

wherein the node device comprises:

a receiving module, configured to receive a data transmission task issued by a control device, when the node device serves as a source node for the data transmission, wherein the data transmission task include an identifier of a destination node for the data transmission and an address of the destination node for the data transmission; and a sending module, configured to transmit data to the destination node for the data transmission, according to the address of the destination node for the data transmission.

12. The system according to claim 11, wherein the determining module is particularly configured to operate a destination node for last data transmission as the source node for the data transmission, if the control device has ever controlled sending of the data.

13. The system according to claim 12, wherein the control device further comprises a first receiving module, wherein:
the first receiving module is configured to periodically receive data reception progress reported by the destination node for the last data transmission, before the determining module operates the destination node for the last data transmission as the source node for the data transmission; and
the determining module is further configured to determine that the last data transmission has been completed, when the received data reception progress is 100%.

14. The system according to claim 11, wherein:
the determining module is further configured to determine that a data reception progress reported by the destination node for the data transmission has not been received within a preset number of periods, after the issuing module issues the data transmission task to the source node for the data transmission;
the determining module is further configured to determine that the destination node for the data transmission is failed;
the selecting module is further configured to select a node having least sub-nodes as the source node for the data transmission, from the original node and nodes which have received the data in the list of nodes;
the selecting module is further configured to reselect a node which has not been selected for reception of the data as the destination node for the data transmission, from the list of nodes for the reception of the data; and
the issuing module is further configured to issue a data transmission task to the source node for the data transmission, so that the source node for the data transmission transmits the data to the reselected destination node for the data transmission according to the address of the reselected destination node for the data transmission.

15. The system according to claim 11, wherein the determining module is further configured to determine that the data transmission has been completed, if it is determined that all nodes in the list of nodes except the failed node have received the data.

* * * * *